United States Patent [19]

Susa et al.

[11] Patent Number: 5,400,746
[45] Date of Patent: Mar. 28, 1995

[54] INTERNAL COMBUSTION

[75] Inventors: Thomas J. Susa, West Roxbury; Tam V. Tran, Andover, both of Mass.

[73] Assignee: Odex, Inc., Andover, Mass.

[21] Appl. No.: 80,956

[22] Filed: Jun. 21, 1993

[51] Int. Cl.⁶ .................... F02B 47/00; F02B 41/00
[52] U.S. Cl. ................ 123/25 C; 123/25 E; 123/26; 123/585
[58] Field of Search .......... 123/25 C, 25 E, 26, 123/585, 567

[56] References Cited

U.S. PATENT DOCUMENTS

| | | | |
|---|---|---|---|
| 3,696,795 | 10/1972 | Smith et al. | 123/25 C |
| 4,120,268 | 10/1978 | Bastenhof | 123/25 C |
| 4,290,392 | 9/1981 | Dissmore | 123/25 C |
| 4,417,447 | 11/1983 | Thomas | 123/25 C |
| 5,051,113 | 9/1991 | Nemser | 123/26 |
| 5,125,366 | 6/1992 | Hobbs | 123/25 C |
| 5,237,964 | 8/1993 | Tomoiu | 123/25 C |

FOREIGN PATENT DOCUMENTS

| | | | |
|---|---|---|---|
| 3332600 | 3/1985 | Germany | 123/25 C |
| 0151150 | 11/1980 | Japan | 123/567 |
| 0145350 | 8/1984 | Japan | 123/567 |

*Primary Examiner*—Willis R. Wolfe
*Assistant Examiner*—Erick Solis
*Attorney, Agent, or Firm*—Hale and Dorr

[57] ABSTRACT

A system for simultaneously increasing combustion efficiency and reducing pollutant emissions. Oxygen enriched air (i.e., air from which a portion of the nitrogen has been removed so that the oxygen concentration is higher than in normal air) and water droplets of predetermined size are both present in the cylinder of a four cycle internal combustion engine during the power/combustion stroke. Oxygen enriched air may be mixed with normal air drawn into the combustion chamber during the intake stroke. Also, and alternatively, the droplets may be water or $H_2O_2$ bubbles filled with normal or oxygen-enriched air.

17 Claims, 3 Drawing Sheets

INTERNAL COMBUSTION

This invention relates to internal combustion engines and, more particularly, to systems for increasing combustion efficiency while simultaneously reducing pollution.

BACKGROUND OF THE INVENTION

The overall efficiency of an internal combustion engine depends, among other things, on the amount of fuel that can be burned in a cycle. In recent years, environmental considerations have had an increasing effect. For example, the air/fuel mixture fed into the engine is typically adjusted to prevent complete combustion so that the catalytic convertor will be able to reduce emitted nitrogen oxides to a level that satisfies air emission standards. However, since such an adjustment prevents complete combustion, it results in increased emissions of unburned hydrocarbons and carbon monoxide.

In the past, a large number of systems have been proposed for improving the combustion efficiency. One approach has been to increase the oxygen concentration in the air/fuel mixture, but there are major disadvantages to this technique; the increased oxygen concentration increases the peak temperature in the combustion chamber, and thereby increases the emissions of unwanted nitrogen oxides.

Another proposed approach has been to decrease peak temperature and reduce nitrogen oxide emissions by adding water, usually water vapor, to the combustion chamber. This approach also has disadvantages; in particular, it can result in less complete combustion and thus increase the emissions of unburned hydrocarbons and carbon monoxide.

There remains a need for a system that enables both an increase in the amount (e.g., percentage) of the fuel burned per cycle, and a simultaneous minimization of the amounts of hydrocarbon pollutants, nitrogen oxides and carbon monoxide emitted.

SUMMARY OF THE INVENTION

The present invention improves combustion efficiency and minimizes pollutant emissions by employing oxygen enriched air to increase the oxygen concentration in the air in the combustion chamber while simultaneously injecting water droplets of selected average size to reduce peak temperature.

In a first embodiment, the system features increasing oxygen concentration in the input gas using a semi-permeable membrane having a higher permeability for oxygen than nitrogen, thereby providing a stream of oxygen enriched air in which the relative percent of oxygen is greater than that in air (as contrasted with compressed air in which the relative percent of the constituents is the same as that in normal air), and mixing the oxygen enriched air with normal air so that the oxygen concentration of the gas mixture drawn into the cylinder is greater than that of normal air.

In a second embodiment, the water to be injected into the combustion chamber is mixed with a small amount of a surfactant. Both the water/surfactant mixture and pressurized air (which may be oxygen-enriched) are fed to an injector which injects the water/surfactant into the chamber in the form of air filled droplets or "bubbles". The air/fuel mixture fed into the chamber outside the bubbles may be initially fuel rich, and the bubbles release more oxygen to continue combustion to completion as they break and release additional air entrapped in the bubbles. Due to the initially low oxygen concentration, the rate of combustion is slowed, and the initially available oxygen is insufficient to burn all of the available fuel. Both of these effects lower the peak temperature achieved during the combustion/power stroke, thus minimizing the emissions of unwanted nitrogen oxides.

In a third embodiment, oxygen enriched air is mixed with normal air fed to the intake manifold, and is also used to inject water or hydrogen peroxide droplets into the combustion chamber.

DESCRIPTION OF PREFERRED EMBODIMENTS

Figure 1:
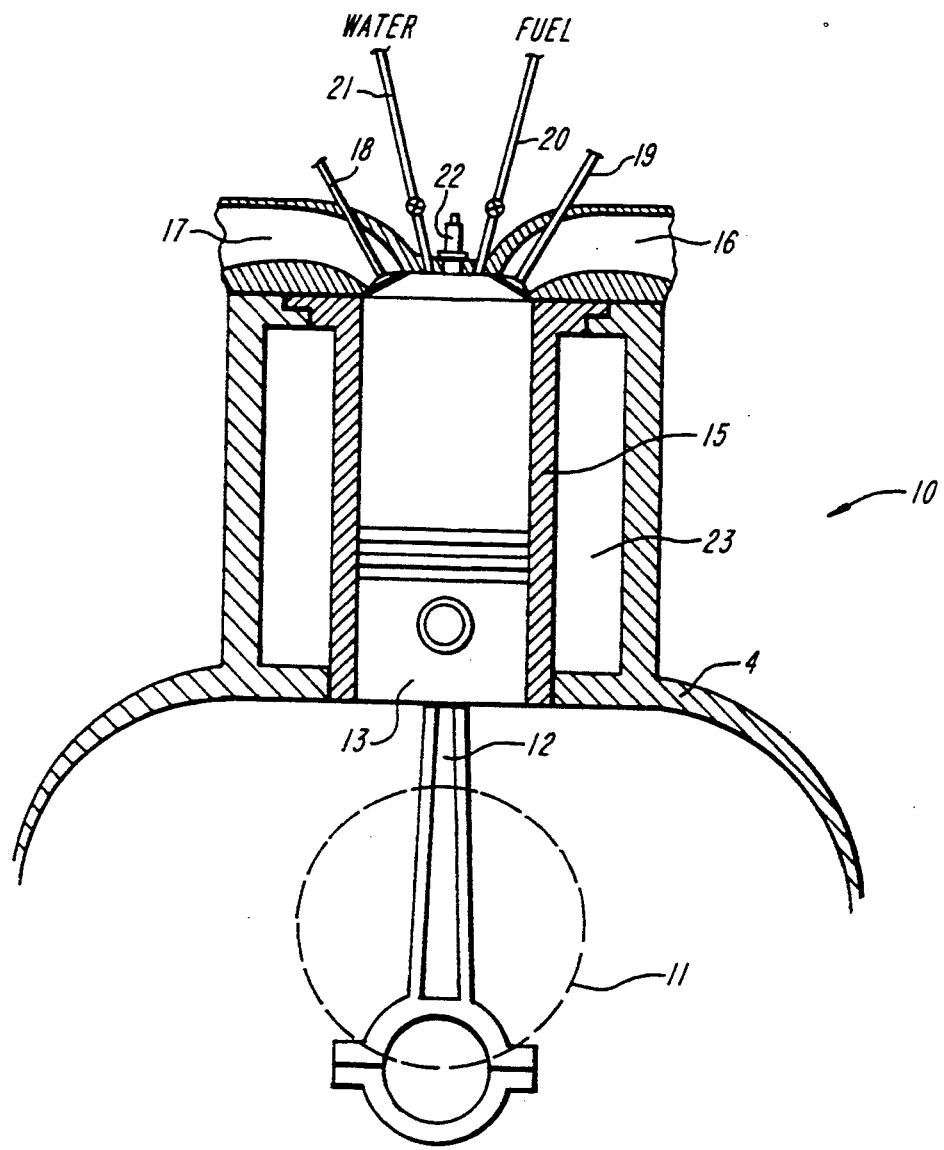
FIG. 1 is a simplified cross-section of a cylinder of an internal combustion engine.

Referring first to FIG. 1, a four stroke, reciprocating internal combustion engine typically includes a number of cylinder assemblies, one of which, generally designated 10, is shown. Assembly 10 includes, as is conventional, a piston 13 mounted for reciprocating movement within a cylinder 15 in response to the rotation of a crank shaft 11 to which the cylinder is attached by a connecting rod 12. A water cooling jacket 23 surrounds the cylinder 15. Air is drawn into the cylinder from an intake manifold 16 through an intake valve 19; and the combustion products from the cylinder 15 are exhausted into the exhaust manifold 17 through exhaust valve 18. Fuel is injected into the top of the cylinder 15 through an injector line 20. An ignitor 22, e.g., a spark plug, is provided in the head of the cylinder for igniting the charge therein.

As thus far described, cylinder assembly 10 is a conventional assembly for four cycle (intake, compression, combustion or power, and exhaust) fuel injected gasoline engine. According to the present invention, a second injector line 21 is provided in the top of the cylinder 15 (or, alternatively, in intake manifold 16) for injecting water droplets (or bubbles in some embodiments) into the cylinder. It will be recognized that such a water droplet injector could also be employed in other internal combustion engines, such carbureted (rather than fuel injected) reciprocating gasoline engines, diesel engines and rotary engines (both carbureted and fuel injected).

The amount of power produced in an engine of the type shown in FIG. 1 is directly related to the amount of fuel that can be burned in the cylinder during the power stroke, which in turn depends on the amount of oxygen available to burn that fuel. If the amount of oxygen in the cylinder is increased, thereby increasing the mole fraction of oxygen relative to the amount of fuel, the amount of fuel that can be burned theoretically will be increased also. In general, the greater the mole fraction of oxygen in the cylinder, the lower the emissions of unburned hydrocarbons and carbon monoxide.

However, there are problems associated with increasing the amount of oxygen. If the additional oxygen is provided by simply increasing the amount of air in the cylinder, e.g., by using a turbo-charger to compress the air before it is drawn into the engine during the intake stroke, the amount of nitrogen introduced into the cylinder will be greatly increased also and the peak temperature will be higher due to the heat of compressing the gasses to an even higher pressure. This usually leads to increased levels of nitrogen oxide pollutants being produced during combustion. Increased nitrogen oxide pollutants are similarly produced when, as is conventional is some race car engines, nitrous oxide is injected into the engine cylinders.

Moreover, and regardless of the oxygen source, increasing the oxygen mole fraction in the cylinder will increase the peak temperature achieved during the combustion stroke and strongly influence the equilibrium and kinetics that determine the level of nitrogen oxide emissions. It has long been recognized that the amount of nitrogen oxide emissions increases rapidly with increases in peak temperature.

A number of approaches have been used to lower peak temperature and reduce nitrogen oxide emissions. One has been to add "non-reactive" gases, such as exhaust gas, to the gasses (e.g. air) drawn into the cylinder during the intake stroke. This reduces the amount of oxygen in the cylinder, results in less fuel being burned per cycle, and reduces the maximum power that can be achieved.

A second approach has been used to add water vapor, typically to the intake air. However, adding water vapor also displaces air (and thus oxygen) and reduces the amount of fuel that can be burned during the combustion/power stroke.

Maximum engine power and performance and minimum emissions can be achieved only by both improving, and combining, oxygen concentration and water addition.

According to the present invention, water (or hydrogen peroxide) droplets, rather than water vapor, are injected into the engine cylinder or cylinder intake manifold. The droplets displace a far smaller amount of air, and hence, oxygen, than does vapor. Additionally the change in state of the droplets (from liquid to gas) during the combustion process absorbs heat, and thus reduces peak temperature and nitrogen oxide emission. However, even water droplets, as they reach the gas state, inevitably reduce the mole fraction of oxygen present in the combustion chamber to some extent, and the decrease in peak temperature also tends to reduce the completeness of burning. Thus, additional water will result in an increase in emissions of carbon monoxide and unburned hydrocarbons unless the oxygen concentration in the cylinder is otherwise increased. It should be noted that the total volume of the water droplets injected into the cylinder largely determines the final average temperature during combustion; but the peak temperature is principally a function of the rate at which the injected water droplets evaporate, together with the other factors such as compression ratio, initial charge temperature, and amount of fuel. The evaporation rate is controlled by managing the average water droplet size (the larger the average droplet size the slower the rate of evaporation), and the timing of the water drop additions to the charge. The earlier the droplets are injected during the intake stroke, the more the droplets evaporate before the combustion stroke starts, the greater the volume the water vapor occupies, and therefore the amount of air (and thus oxygen) that can be drawn in during the intake stroke is reduced.

The present invention provides complete optimization of engine performance, power output, fuel consumption and minimizing pollutant emissions by also controlling both the final oxygen concentration in the cylinder during combustion, and the amount of fuel in the charge being burned. It is theoretically possible to provide increased oxygen in the cylinder by adding pure oxygen to the available combustion air. However, the apparatus required for the storage of pure oxygen significantly increases the weight of a vehicle; more importantly pure oxygen is, potentially, a very dangerous gas. Steel wool burns with a flame in pure oxygen, and oils and greases like petroleum jelly explode when ignited in the presence of pure oxygen. Thus, according to the present invention, the desired increased oxygen concentration in the combustion chamber normally is provided using oxygen enriched air (defined herein as a gaseous mixture produced by removing a fraction of the nitrogen from normal air), thus resulting in a mixture including a greater percentage of oxygen than is present in normal air.

According to a first aspect of the invention, the oxygen enriched air is produced using a gas separation membrane system. Presently available single stage systems, e.g., such as those produced by Air Products, Generon, Monsanto, and others, provide a gas stream in which the oxygen concentration is about 35% (i.e., about 166% that of air, in the enriched stream, and greater concentrations can be obtained using multiple stage systems. Several suitable membrane systems are discussed in U.S. Pat. No. 5,051,113. Improved gas separation membranes are frequently being introduced, and may be used in this invention. Regardless of the membrane system used, the oxygen enriched output may be mixed with normal air in the ratio required to produce an oxygen enriched air stream which will provide the desired oxygen concentration in the cylinder. The ratio at which normal air is mixed with the oxygen enriched air from the membrane system can be varied over a wide range to permit the percentage of oxygen, in the gas that is input to the cylinder to be anywhere between the oxygen concentration in normal air and that in the oxygen enriched air stream.

Figure 2:
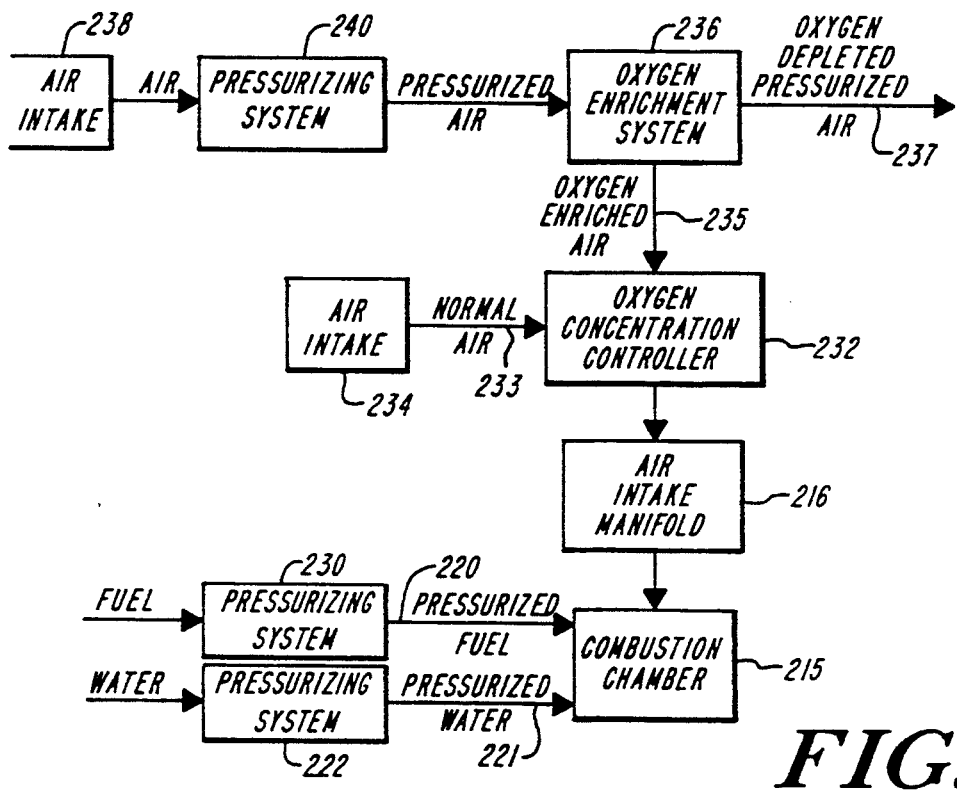
FIGS. 2–4 are schematics illustrating the invention.

Reference is now made to FIG. 2 which illustrates, somewhat schematically, a system for controlling the combustion in an internal combustion engine, e.g., a reciprocating engine having cylinder assemblies such as assembly 10 to FIG. 1. To the extent that components of the system shown in FIG. 2 correspond to elements of the assembly of FIG. 1, the same reference numbers are used with an initial "2" added (i.e., the combustion chamber in FIG. 1 is number 15; that in FIG. 2 is 215.)

As shown, and discussed previously in connection with assembly 10 of FIG. 1, oxygen enriched air is directed into the combustion chamber (e.g. cylinders) 215 of the engine of FIG. 2 either directly (as in FIG. 1) or from an intake manifold 216 (as shown in FIG. 2). Pressurized fuel and pressurized water are directed into the chamber 215 through, respectively, injector lines 220 and 221.

The fuel (e.g., gasoline or diesel fuel) is pressurized and injected using a mechanical injector system 230 such as that conventionally used to inject fuel into diesel engines. A similar mechanical injector system 232 provides injection of water droplets directly into the combustion chamber 215. The amounts of fuel and water injected, the average size of the water droplets, and the timing of the injections are controlled according to the engine load and RPM, the amount and type of fuel, and the desired final oxygen concentration. Systems for monitoring and/or controlling each of these are readily available or constructed; and in many circumstances are found in conventional mechanical or pneumatic (e.g., air powered) injection systems. Typically, water droplets ranging from 0.5 to 100 microns are injected at a time from shortly before the time the intake stroke begins until a time before the end of the compression stroke. The total amount of water injected as droplets is adjusted to prevent the peak temperature reached from exceeding the temperature which would cause the generation of nitrogen oxides, and will be dependent on the type of fuel burned, the amount of fuel burned, the compression ratio, and the temperature of the intake charge.

The gas stream input to intake manifold 216 is oxygen enriched, and the extent of oxygen enrichment is controlled by oxygen concentration controller 232. As shown, one input 233 to oxygen controller 232 is normal air from air intake 234. The other input 235 to oxygen concentration controller 232 is oxygen enriched air from oxygen enrichment system 236. In the illustrated embodiment, oxygen enrichment system 236 is a membrane air separator (such as that shown in U.S. Pat. No. 5,051,113) that includes a semipermeable membrane having a higher permeability for oxygen than for nitrogen. In operation the membrane of system 236 separates input pressurized normal air (from air intake 238 and air pressurizing system 240) into an oxygen enriched air stream, which is input to oxygen controller 232 through outlet 235, and an oxygen depleted air stream, which is exhausted to the atmosphere through output 237. Alternatively, the air stream may be exhausted through an energy recovery turbine so that the energy contained in the oxygen depleted stream can be used to pressurize normal air in air pressurizing system 240.

Typically, the oxygen enriched air stream from oxygen enrichment system 236 has an oxygen concentration of about 35% (although improved air separation membranes may be produced which would allow even higher concentrations from a single stage system), and thus contains a considerably lower percentage of nitrogen than does normal air. Oxygen controller 232 mixes the gas streams from its two inputs i.e., normal air from air intake 234 and oxygen enriched air from the oxygen enrichment membrane system 236, and provides an oxygen enriched air output to air manifold 216; having the desired oxygen concentration, typically in the range of about 20% to 45% oxygen and, preferably 22% to 35% oxygen. The air mixture is then drawn from intake manifold 216 into the combustion chamber 215 during the intake stroke of the cylinder assembly.

Figure 3A:
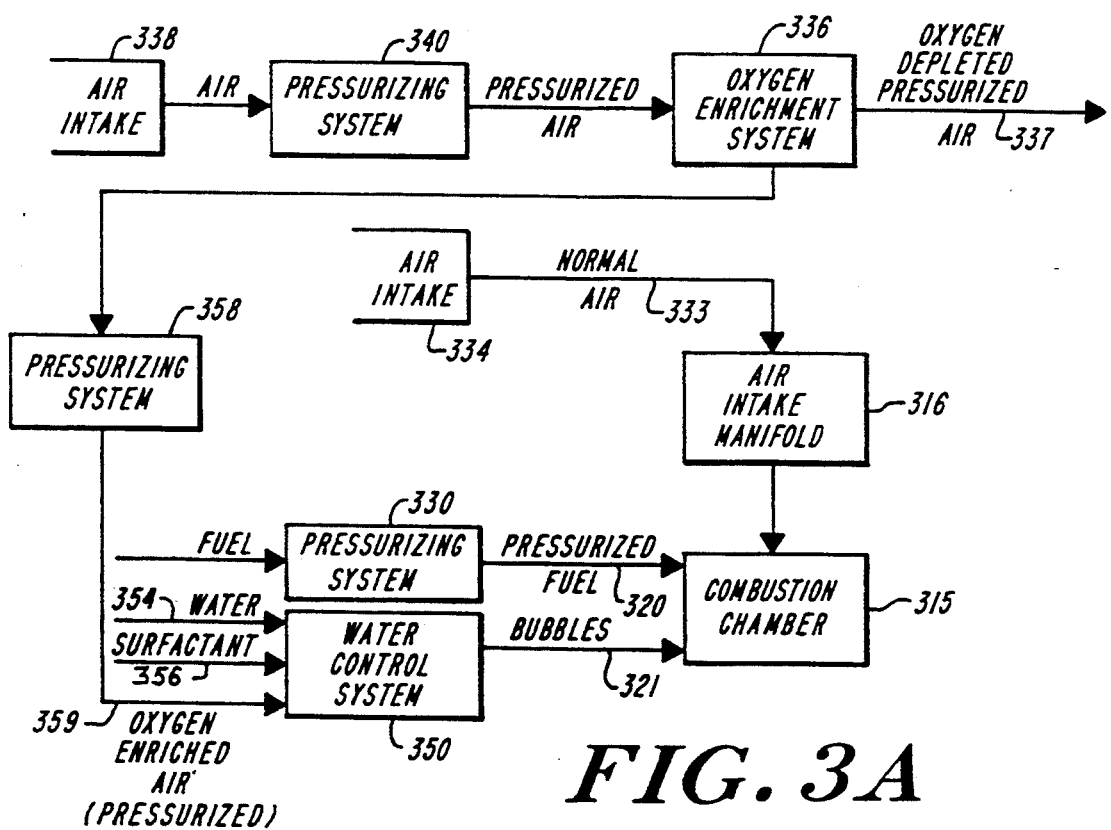
Figure 3B:
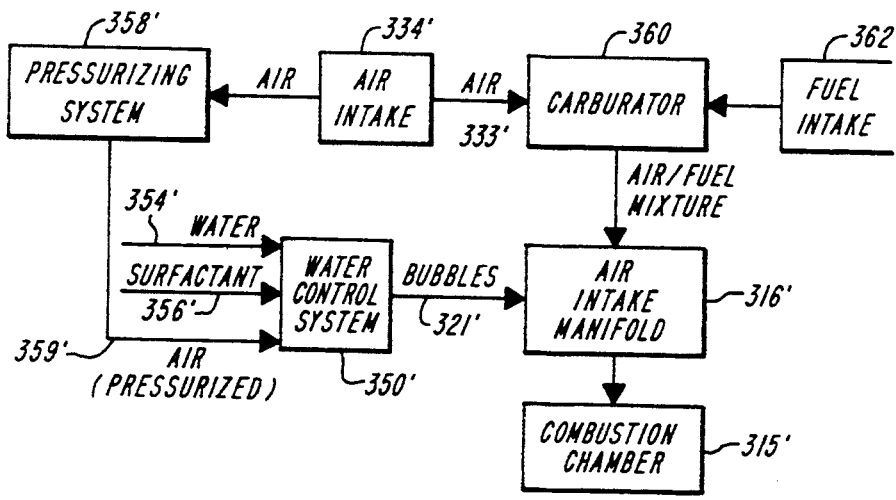

FIGS. 3A and 3B illustrate other embodiments of the invention. To the extent that portions of the system of FIG. 3A, and of the alternative system of FIG. 3B, are substantially the same as that of FIG. 2, the last two digits of the numbers used to identify them are the same, e.g., the combustion chamber of the systems of FIGS. 3A and 3B is designated 315, that of FIG. 2 is designated 215.

In the system of FIG. 3A, normal air from air intake 334 is directed to air intake manifold 316 and from which it is drawn (or forced, depending on the type of engine) into combustion chamber 315. Similarly, fuel injector system 330 injects fuel into the combustion chamber through fuel injector inlet 321.

Oxygen enrichment system 336 of FIG. 3A, again typically a membrane separation system, receives pressurized air from intake 328 and pressurization system 340, exhausts oxygen depleted air to the atmosphere through exhaust outlet 337 (or an energy recovery turbine), and provides pressurized oxygen enriched air (again typically containing about 35% oxygen) at enriched air outlet 335.

The oxygen enriched air from outlet 335 is directed to water control system 350. As indicated, water control system 350 has three inlets: oxygen enriched air inlet 359, water inlet 354, and surfactant inlet 356. A pressurizing system 358 pressurizes the oxygen enriched air stream from enrichment system 336, typically to a pressure of about 5 to 90 PSIG, and provides the pressurized enriched air to inlet 352. Water control system 350 includes bubble maker to produce bubbles from the mixture of water, surfactant and enriched oxygen air. Pneumatically powered bubble makers of various designs are readily available or constructed. The surfactant is used to adjust the surface tension of the liquid to improve control of bubble size and bubble duration. The surfactant used is preferably a low cost nonionic surfactant (such as ethoxylated alcohols, ethoxylated phenols, etc.) or a surfactant employing carboxylic acid as the charged group, rather than ionic surfactants containing sulfur, nitrogen, phosphorus, etc. which would increase the pollutant emissions and/or engine corrosion. Pressurized oxygen enriched air is fed to the high pressure gas inlet of the bubble maker, thus producing a stream of water/surfactant bubbles filled with oxygen enriched air.

In the system of FIG. 3A, the water control system injects the bubbles into combustion chamber 315 through inlet 321.

In the alternative system illustrated in FIG. 3B, air intake 334' provides normal air to both pressurizing system 358' and a carburetor 360. Rather than being injected, fuel from fuel intake 362 is mixed with the normal air in carburetor 360, and the resulting air/fuel mixture is directed into air intake manifold 316'. Pressurizing system 358' provides pressurized normal air to the air inlet 359' of water control system 350'. In the same manner as in the system of FIG. 3A, water control system 350' produces a stream of water/surfactant bubbles filled with oxygen-containing normal air. In the system of FIG. 3B, the bubbles are injected either directly into the combustion chamber 315' or, as shown, into air intake manifold 316' in which case both the oxygen-containing bubbles and normal air from air intake 334' are be drawn into the combustion chamber 315' during the intake stroke.

By varying the flow rate and pressure of the oxygen-containing (either oxygen-enriched or normal) air stream produced by pressurizing system 358, 358' and adjusting the initial orifice of the bubble maker, both the size and number of bubbles produced can be varied. Both the amount of water and the amount of oxygen-containing air injected into the combustion chamber 315, 315' can thus be independently controlled. Typically the average size of the bubbles is between 0.5 microns to 2 millimeters external diameter. The optimal number and average size of the bubbles is a function of engine load, engine speed (i.e., rpm), combustion chamber environment (e.g., wall temperature), amount and type of fuel, oxygen content of the gas within the bubbles, and cylinder compression ratio.

In both the system of FIG. 3A and that of FIG. 3B, the initial air/fuel mixture in combustion chamber 315, 315' is typically fuel rich. In the system of FIG. 3A, this initial air/fuel mixture results from normal air drawn into the combustion chamber from the intake manifold 316 and fuel injected into the chamber through fuel inlet 320; in the system of FIG. 3B, the initial air/fuel mixture is that produced by carburetor 360. The fuel rich mixture is easy to ignite. It also will not reach as high a peak temperature as a stoichiometric mixture, as there is not enough oxygen in the mixture to completely burn the fuel, and the initially low oxygen concentration will also slow the rate of combustion, thus limiting the peak temperature produced.

The additional oxygen required for complete combustions, which minimizes the production of carbon monoxide and unburned hydrocarbons, is provided by the oxygen-containing bubbles injected through inlet 321, 321'. The heat produced by burning of the initial fuel rich mixture causes the bubbles to break, releasing additional oxygen to make the overall mixture fuel lean and cause combustion efficiently to continue to completion.

The overall two-stage combustion process (initial burning of fuel rich mixture followed by oxygen addition to promote complete combustion, has important advantages. Minimization of nitrogen oxide emissions is promoted by the relatively low peak temperature resulting from both combustion of the initial fuel rich mixture and the evaporation of water from the bubbles. The complete combustions provided by oxygen from the breaking bubbles reduces emissions of particulates, unburned hydrocarbons and carbon monoxide. The water from the bubbles also increases cylinder pressure, and thus power output.

Figure 4:
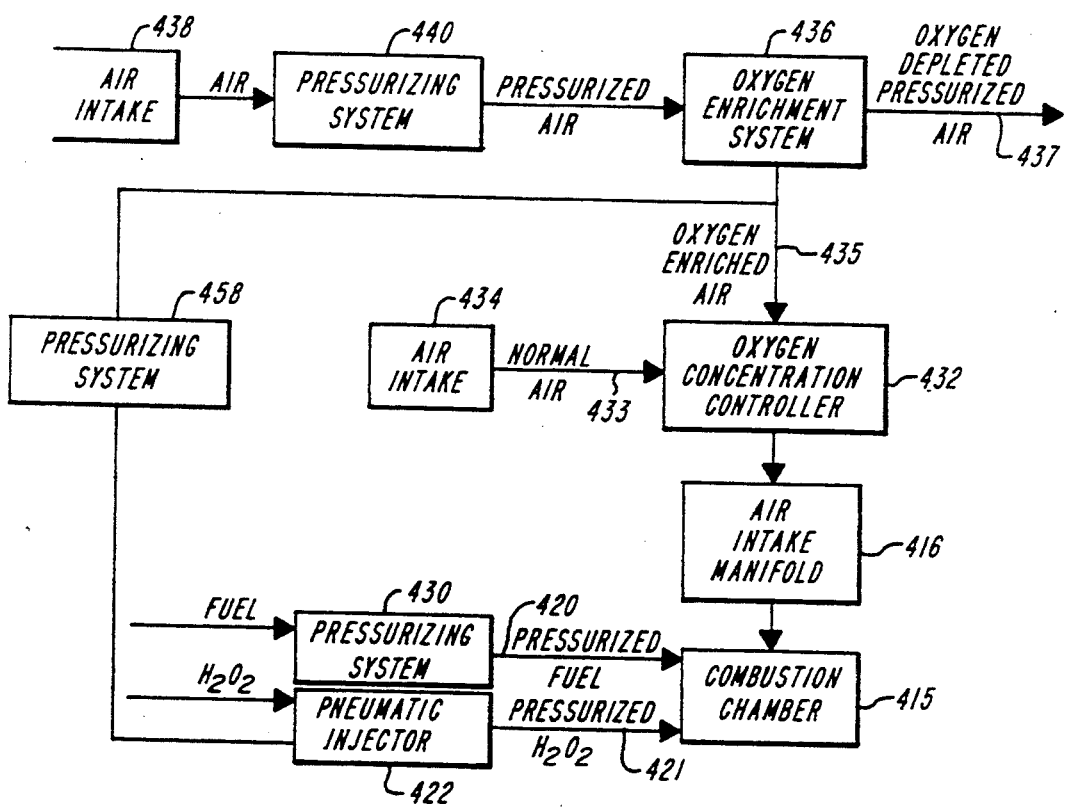

FIG. 4 illustrates yet another system embodying the present invention. It will be seen that the system of FIG. 4 is in large part the same as that of FIG. 2, and corresponding portions of the two systems are identified by number having the same last two digits, with the initial digit corresponding to the initial digit of the particular system. Thus, for example, the combustion chamber of the system of FIG. 4 is designated 415, while that of the system of FIG. 2 is designated 215.

In the system of FIG. 4, droplets of hydrogen peroxide, rather than water, are injected into the combustion chamber 415 by a pneumatic injector 432. Injector 432 is powered by pressurized (by pressurization system 458) oxygen enriched air from the oxygen enrichment system 436. As in the system of FIG. 2, injector 432 controls both the average size of the droplets, and the rate at which they are injected. However, because the injection system is pneumatic, the oxygen enriched air used to form the droplets is also injected into combustion chamber 415, and adds to the final oxygen concentration in combustion chamber 415. In combustion chamber 415, evaporation and reaction of the hydrogen peroxide droplets both lower the peak temperature (hence decreasing nitrogen oxide emissions). The hydrogen peroxide droplets also provide additional oxygen for the combustion process.

Other embodiments will be within the scope of the following claims. For example, it is evident that water, or a water surfactant mixture, could be employed in lieu of hydrogen peroxide in the system of FIG. 4. It is also evident that the carburetors rather than fuel injectors may be employed, and that fuel and/or water injectors may be placed in the intake manifold close to the intake valve rather than in the combustion chamber to effect similar results; although placement in the intake manifold is not quite as effective as placement in the cylinder, placement in the intake manifold may reduce the maintenance of the injectors compared to placement in the harsh environment of the combustion chamber.

Other embodiments will be within the scope of the following claims.

What is claimed is:

1. A process for improving the combustion efficiency of an internal combustion engine while simultaneously reducing pollutant emissions, said engine having an intake cycle and a combustion cycle, said process comprising the steps of:
   a. producing a stream of oxygen enriched air;
   b. producing a stream of droplets selected from the group consisting of $H_2O$ droplets and $H_2O_2$ droplets, said droplets being of predetermined average size;
   c. introducing a fuel charge into the combustion chamber of said engine;
   d. introducing a controlled amount of said oxygen enriched air stream into said combustion chamber to increase the oxygen concentration in said combustion chamber during said combustion cycle to a concentration greater than that of normal air; and
   e. introducing a controlled amount of said stream of droplets into said combustion chamber during said combustion cycle.

2. The process of claim 1 including the step of producing said stream of oxygen enriched air using a semipermeable membrane system, and wherein the concentration of oxygen in said stream is in the range of about 25% to about 45%.

3. The process of claim 1 including the step of mixing said stream of oxygen enriched air with normal air in a controlled ratio, and thereafter directing said mixture into said combustion chamber during said intake cycle and before said combustion cycle.

4. The process of claim 1 including the steps of: mixing water and a surfactant, and injecting said stream of oxygen enriched air into said water/surfactant mixture, whereby said stream of droplets comprises a stream of bubbles of said water/surfactant mixture filled with said oxygen enriched air.

5. The process of claim 4 wherein said engine includes an air inlet and said step of introducing a controlled amount of said oxygen enriched air into said chamber includes introducing said oxygen enriched air through said inlet and in said bubbles.

6. The process of claim 5 including mixing oxygen enriched air with normal air before introducing said oxygen enriched air through said inlet.

7. The process of claim 1 wherein said droplets are water.

8. The process of claim 7 wherein said droplets have an average size in the range of 0.5 to 100 microns external diameter and the concentration of oxygen in said oxygen enriched air is in the range of about 20% to about 45%.

9. The process of claim 1 wherein said droplets are hydrogen peroxide.

10. The process of claim 1 wherein said engine has an intake valve and said enriched air stream is injected upstream of said valve.

11. A process for improving the combustion efficiency of an internal combustion engine while simultaneously reducing pollutant emissions, said engine having an intake cycle and a combustion cycle, said process comprising the steps of:
   a. introducing a fuel charge into the combustion chamber of said engine;
   b. producing a stream of oxygen-containing water bubbles; and, c. introducing a controlled amount of said stream into said combustion chamber to reduce peak combustion temperature during the combustion cycle and to provide additional oxygen after the initial portion of said combustion cycle.

12. The process of claim 11 wherein said bubbles are selected from the group consisting of water bubbles and $H_2O_2$ bubbles.

13. The process of claim 11 wherein said bubbles contain oxygen-enriched air.

14. The process of claim 11 wherein said bubbles contain normal air.

15. The process of claim 11 including the steps of mixing water and a surfactant, and forming said bubbles by injecting an oxygen-containing gas into said water/surfactant mixture.

16. The process of claim 15 wherein said oxygen-containing gas is oxygen enriched air.

17. The process of claim 11 wherein said fuel charge is fuel rich.

* * * * *